United States Patent Office.

HENRIETTA T. WOOD, OF SAN FRANCISCO, CALIFORNIA.

Letters Patent No. 78,409, dated May 26, 1868.

IMPROVED OINTMENT.

*The Schedule referred to in these Letters Patent and making part of the same.*

TO ALL WHOM IT MAY CONCERN:

Be it known that I, HENRIETTA T. WOOD, of the city and county of San Francisco, State of California, have invented an Improved Curative Ointment; and I do hereby declare that the ingredients used in making said ointment, and the process of mixing and compounding them to make it, are described in the following specification.

The nature of my invention is to provide an improved ointment for cuts, wounds, bruises, burns, scalds, salt rheum, chapped hands, excoriations, piles, sore nipples, and other fractures and diseases of the body.

For the preparation of my ointment, I use the following ingredients, to wit: Two (2) pounds of refined lard; one-quarter ($\frac{1}{4}$) of a pound of mutton tallow; two (2) ounces of beeswax; one (1) ounce of *Arnica montana;* and one-half ($\frac{1}{2}$) ounce of stramonium-leaves or flowers. Place the arnica-flowers and stramonium-leaves in an earthen vessel, pour just enough boiling water upon them to moisten them, and set in a warm place to macerate for six hours. Then add the lard, and simmer the whole over a slow fire until the water is all evaporated, after which it is to be strained through a fine flannel, which, for convenience, is made into the form of a bag, into the earthen vessel above described. The beeswax and mutton tallow are now added, and the whole simmered again for the space of one hour; after which it is strained into boxes to cool for use.

Having thus described my invention, what I claim, and desire to secure by Letters Patent, is—

The above-described composition for ointment, made of the ingredients enumerated, mixed or compounded in about the proportions specified.

In witness whereof, I have hereunto set my hand and seal.

HENRIETTA T. WOOD. [L. S.]

Witnesses:
C. W. M. SMITH,
J. DENNIS, Jr.